United States Patent
McGowan

(10) Patent No.: US 11,760,665 B2
(45) Date of Patent: Sep. 19, 2023

(54) EFFLUENT TREATMENT MIXTURE

(71) Applicant: RKM IP Holding LLC, Dover, DE (US)

(72) Inventor: Roger Kendall McGowan, Buda, TX (US)

(73) Assignee: RKM IP Holding LLC, Dover, DE (US)

( * ) Notice: Subject to any disclaimer, the term of this patent is extended or adjusted under 35 U.S.C. 154(b) by 0 days.

(21) Appl. No.: 15/782,585

(22) Filed: Oct. 12, 2017

(65) Prior Publication Data

US 2018/0099884 A1    Apr. 12, 2018

Related U.S. Application Data

(60) Provisional application No. 62/407,459, filed on Oct. 12, 2016.

(51) Int. Cl.
| | |
|---|---|
| *C02F 1/56* | (2023.01) |
| *C02F 1/24* | (2023.01) |
| *C02F 11/127* | (2019.01) |
| *C02F 11/147* | (2019.01) |
| *C02F 1/52* | (2023.01) |
| *C02F 1/38* | (2023.01) |
| *C02F 103/22* | (2006.01) |
| *C08F 226/04* | (2006.01) |

(52) U.S. Cl.
CPC ............ *C02F 1/56* (2013.01); *C02F 1/24* (2013.01); *C02F 1/5227* (2013.01); *C02F 11/127* (2013.01); *C02F 11/147* (2019.01); *C02F 1/385* (2013.01); *C02F 1/5272* (2013.01); *C02F 2103/22* (2013.01); *C08F 226/04* (2013.01)

(58) Field of Classification Search
None
See application file for complete search history.

(56) References Cited

U.S. PATENT DOCUMENTS

| | | | | |
|---|---|---|---|---|
| 4,661,263 | A * | 4/1987 | Roark | C08F 26/02 |
| | | | | 210/735 |
| 5,069,783 | A * | 12/1991 | Wang | C02F 1/28 |
| | | | | 210/207 |
| 5,112,500 | A * | 5/1992 | Jones | C02F 1/5227 |
| | | | | 210/734 |
| 5,213,693 | A * | 5/1993 | McGrow | C02F 1/54 |
| | | | | 210/734 |
| 5,476,522 | A * | 12/1995 | Kerr | B01D 21/01 |
| | | | | 44/620 |

(Continued)

OTHER PUBLICATIONS

U.S. Appl. No. 62/407,459, filed Oct. 12, 2016.
SNF Floerger®. Coagulation-Flocculation. Brochure, www.snf.us, originally downloaded Sep. 30, 2016, 10 pages.

*Primary Examiner* — Clare M Perrin
(74) *Attorney, Agent, or Firm* — Craig R. Miles; CR MILES P.C.

(57) ABSTRACT

A coagulant-flocculant mixture, a method of making such a coagulant-flocculant mixture, and a method of using such a coagulant-flocculant mixture for treating effluent containing particles within an aqueous medium to facilitate separating the particles and the aqueous medium, whereby the coagulant-flocculant mixture includes an amount of coagulant combined with an amount of flocculant.

15 Claims, 5 Drawing Sheets
(1 of 5 Drawing Sheet(s) Filed in Color)

(56) References Cited

U.S. PATENT DOCUMENTS

| | | | | |
|---|---|---|---|---|
| 5,614,103 | A | * | 3/1997 | Agree .................. C02F 1/5245 210/725 |
| 5,837,100 | A | * | 11/1998 | Gerli .................... D21H 17/455 162/168.3 |
| 9,321,663 | B2 | | 4/2016 | Sikes et al. |
| 2002/0112836 | A1 | * | 8/2002 | Ward .................... D21H 21/10 162/168.3 |
| 2003/0209499 | A1 | * | 11/2003 | Haase ...................... C02F 1/56 210/728 |
| 2005/0194323 | A1 | * | 9/2005 | Ruth ........................ C02F 1/56 210/205 |
| 2006/0016761 | A1 | * | 1/2006 | Mohammed .......... C02F 1/5245 210/728 |
| 2007/0187330 | A1 | * | 8/2007 | Whittaker ............... C02F 11/14 210/723 |
| 2010/0213405 | A1 | * | 8/2010 | Wensloff ................ C02F 1/288 252/181 |
| 2014/0061136 | A1 | * | 3/2014 | Schrand ............... C02F 1/5236 210/207 |
| 2014/0166586 | A1 | * | 6/2014 | Sikes ..................... C08L 77/04 210/708 |
| 2015/0183668 | A1 | * | 7/2015 | Mitsui ...................... C02F 1/56 252/180 |

* cited by examiner

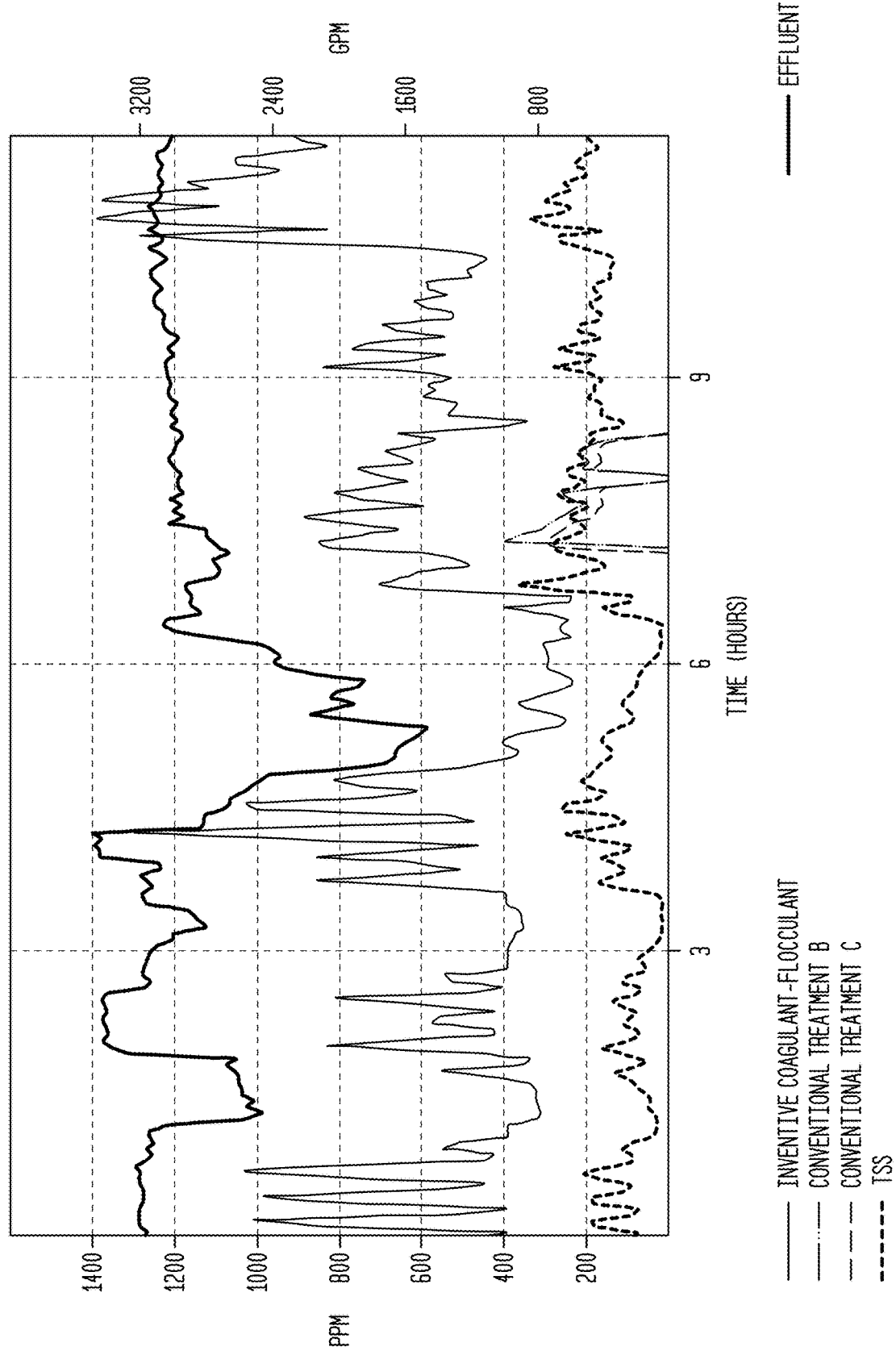

EFFLUENT TREATMENT MIXTURE

This United States Non-Provisional patent application claims the benefit of U.S. Provisional Patent Application No. 62/407,459, filed Oct. 12, 2016, hereby incorporated by reference herein.

I. SUMMARY OF THE INVENTION

A broad object of a particular embodiment of the invention can be to provide a coagulant-flocculant mixture, a method of making such a coagulant-flocculant mixture, and a method of using such a coagulant-flocculant mixture for treating effluent containing particles within an aqueous medium to facilitate separating the particles and the aqueous medium, whereby the coagulant-flocculant mixture includes an amount of coagulant combined with an amount of flocculant.

Naturally, further objects of the invention are disclosed throughout other areas of the specification, drawings, photographs, and claims.

II. BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A is graph showing a decrease in total suspended solids (TSS) in effluent as a result of the addition of an embodiment of the instant coagulant-flocculant mixture.

III. DETAILED DESCRIPTION OF THE INVENTION

Figure 1:
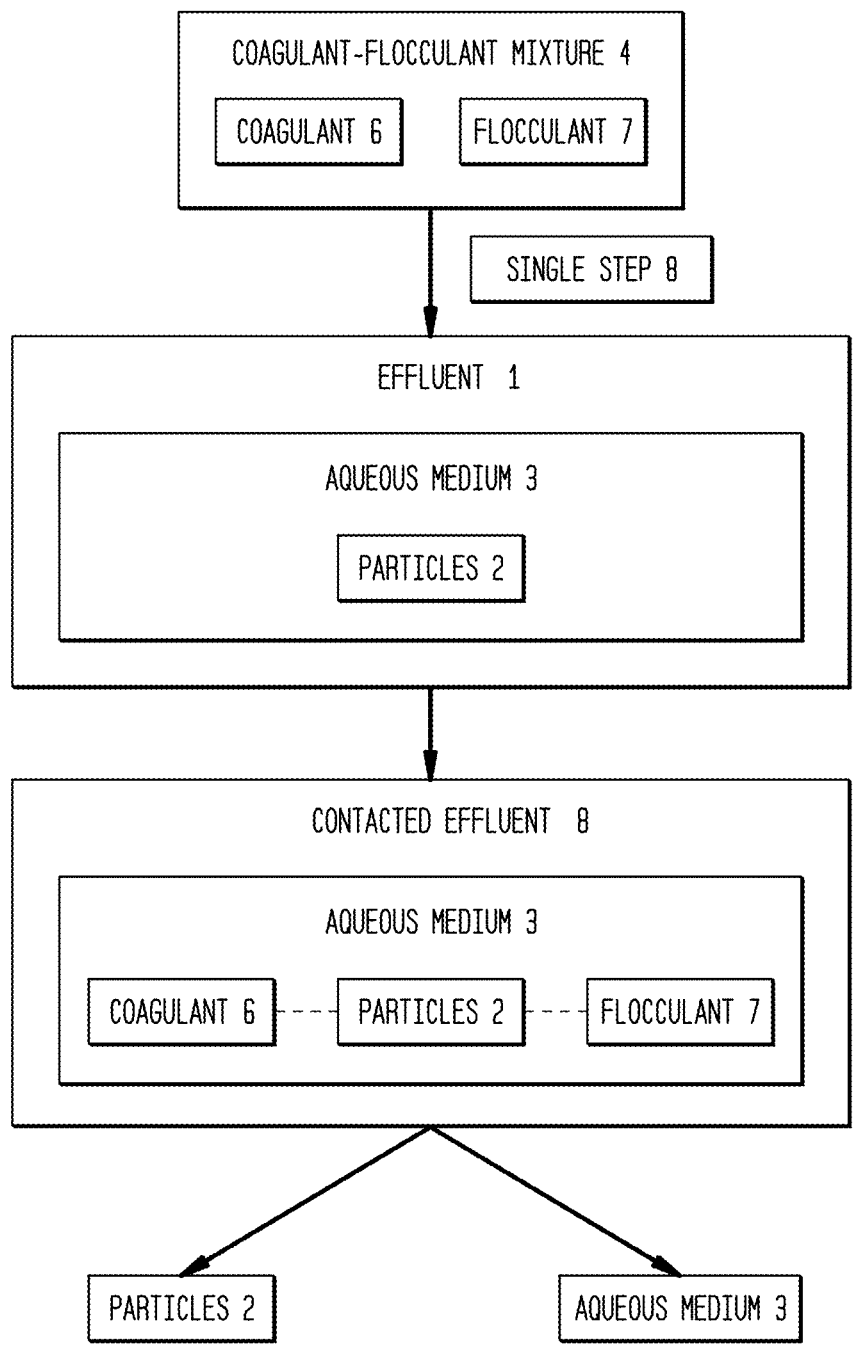
FIG. 1 is a flow chart illustrating an embodiment of the instant method of treating effluent.

Now referring primarily to FIG. 1, which illustrates an embodiment of the instant inventive method of treating effluent (1) containing particles (2) within an aqueous medium (3), whereby an amount of the instant inventive coagulant-flocculant mixture (4) can be combined with an amount of the effluent (1) to provide contacted effluent (5) and facilitate separating the particles (2) and the aqueous medium (3).

For the purposes of the present invention, the term "effluent" means a flow of matter whereby the matter can, but need not necessarily, include waste material.

Chemical Treatment

The instant method for treating effluent (1) can be useful for clarification of an aqueous medium (3), such as an aqueous liquid like water, containing particles (2), for instance suspended particles (2), as may be found in outflows generated by, as non-limiting examples, agricultural, industrial, sewage, and mining operations.

As used herein, the term "suspended" means dispersed within a medium but typically not dissolved in the medium, whereby particles (2) can be kept dispersed by agitation (mechanical suspension), by molecular motion in the surrounding medium (colloidal suspension), or a combination thereof.

Of note, the suspended particles (2) can be formed from a numerous and wide variety of materials, including as non-limiting examples, solids, fats, greases, and oils. Upon recovery following treatment of the effluent (1), the particles (2) can be collected for utilization or disposal.

As used herein, the term "solids" means materials other than fats, greases, and oils which may be generally stable in shape and accordingly, may not be fluid in form, such as proteinaceous materials.

Figure 2:
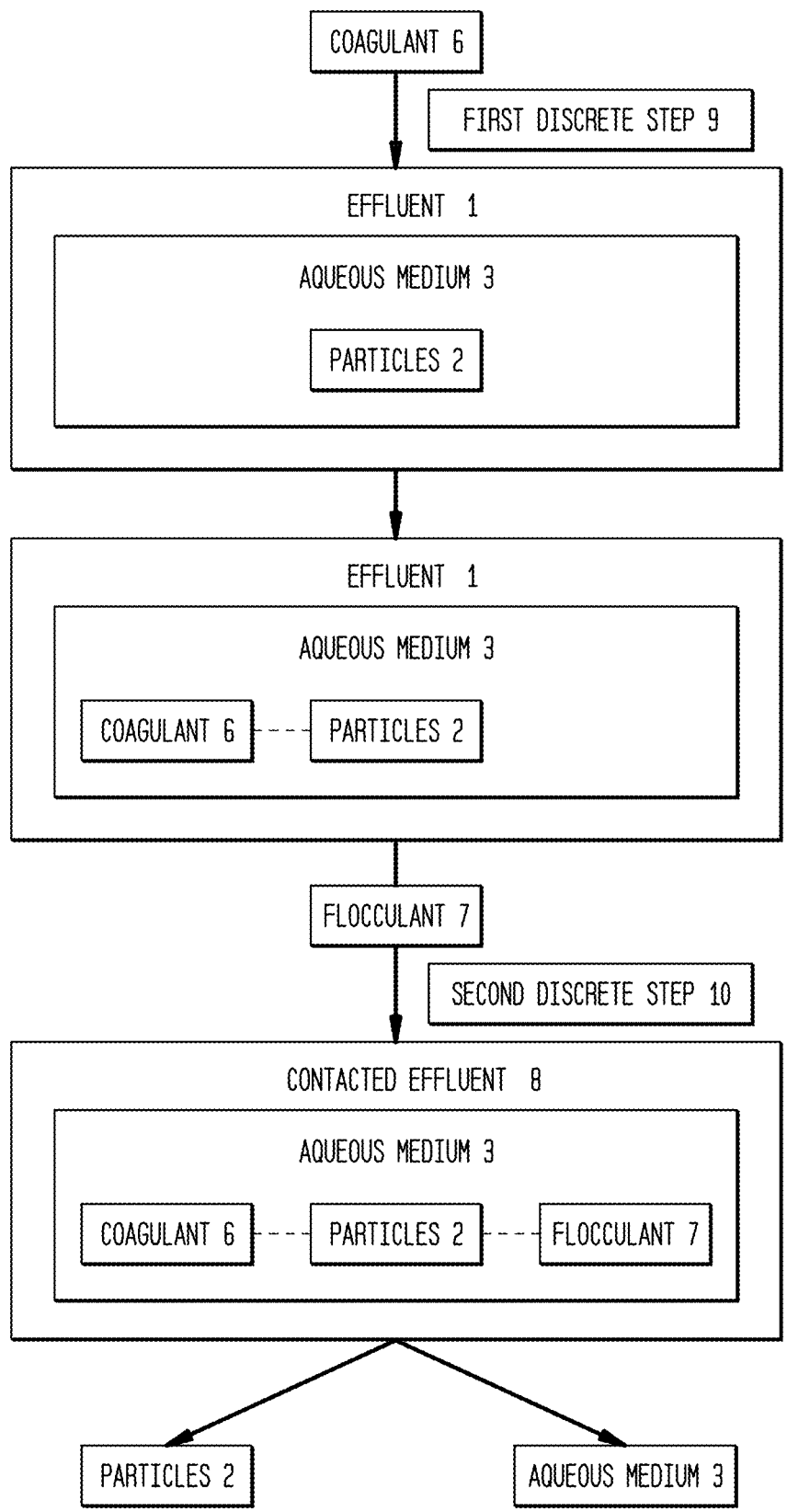
FIG. 2 is a flow chart illustrating a conventional effluent treatment process.

The instant method advantageously eliminates at least one step typically employed in conventional effluent treatment processes (as shown in the example of FIG. 2), which may lessen the amount of time and/or equipment required to clarify the effluent (1) relative to conventional effluent treatment processes.

Further, the instant method may provide greater clarification of the aqueous medium (3) by using lesser amounts of active agents (i.e., coagulant (6) and flocculant (7)) relative to conventional effluent treatment processes.

Following, the instant method includes a single step (8) of combining an amount of a coagulant-flocculant mixture (4) with an amount of effluent (1) to facilitate separating the particles (2) and the aqueous medium (3). Upon combining, a contacted effluent (5) can be provided, whereby the coagulant (6) and the flocculant (7), both derived from the coagulant-flocculant mixture (4), can be in contact with the effluent (1) and specifically, can be in contact with the particles (2) in the effluent (1), thus allowing the coagulant (6) and the flocculant (7) to interact with the particles (2).

Importantly, the instant method is in stark contrast to conventional effluent treatment processes (as shown in the example of FIG. 2) in which a coagulant (6) is combined with effluent (1) in a first discrete step (9). Subsequently, in a second discrete step (10), a flocculant (7) is added to the coagulant (6) and effluent (1) previously-combined in the first discrete step (9) to provide contacted effluent (5). Thus, the contacted effluent (5) is achieved after not less than two discrete steps (9)(10) in conventional effluent treatment processes whereas the instant method advantageously teaches provision of the contacted effluent (5) after only a single step.

Coagulant

In effluent treatment processes, coagulation can be the result of the addition of a chemical coagulant (6) to effluent (1) containing suspended particles (2), which may be termed colloids, to promote agglomeration of the colloids and formation of microflocs or flocs.

Of note, colloids can typically be suspended insoluble particles (2), which may be particularly stable due to their relatively small size, for example a particle diameter of less than one micron. The stability, and consequently the instability, of colloids can be attributed to a plurality of attractive and repulsive forces, such as Van der Waals forces, electrostatic forces, universal attraction, and Brownian motion.

As non-limiting examples, colloids may be formed from minerals, organic matter, and even microorganisms.

Without being bound by theory, it is believed that the primary function of the coagulant (6) can be to destabilize the colloids, which can generally be accomplished by neutralizing the electrical charge present of the surface of each colloid, thus facilitating agglomeration of the colloids.

Concisely, coagulation can be generally summarized as follows: upon addition of the coagulant (6), colloids undergo charge neutralization which lessens the repulsive forces between the colloids, thereby allowing the neutralized colloids to agglomerate and form microflocs.

As to particular embodiments, a coagulant (6) useful with the instant method to neutralize the charge of the colloids in the aqueous medium (3) can be an organic coagulant (6).

As to particular embodiments, an organic coagulant (6) useful with the instant method to neutralize the charge of the colloids in the aqueous medium (3) can be a cationic coagulant (6), which of course, is positively charged. Typically, the cationic charge can be provided by a quaternary ammonium cation incorporated into a polymer.

As but a first illustrative example, the cationic coagulant (6) can be polyDADMAC (CAS No.: 26062-79-3), which is a homopolymer of diallyldimethylammonium chloride (DADMAC).

As but a second illustrative example, the cationic coagulant (6) can be a polyamine, such as poly(epi-DMA), which is a homopolymer of epichlorohydrin-dimethylamine (epi-DMA).

Flocculant

In effluent treatment processes, flocculation results in aggregation of the destabilized colloids or microflocs formed via coagulation.

Typically, a flocculant (7) can be a polymer which, without being bound by theory, is believed to interact with the destabilized colloids or microflocs to increase the particle size of the agglomerates, thereby producing flocs (which may be visible as opposed to microscopic), whereby the flocculant (7) can bond to the destabilized colloids or microflocs via ionic bonds and/or hydrogen bonds. Following, the floc may float to the top of the aqueous medium (3) or settle to the bottom of the aqueous medium (3), depending upon the application.

As to particular embodiments, a flocculant (7) useful with the instant method can be a nonionic flocculant (7).

As to other particular embodiments, a flocculant (7) useful with the instant method can be a cationic flocculant (7), which of course, is positively charged.

As but one illustrative example, the cationic flocculant (7) can be a cationic polyacrylamide.

A wide variety of cationic polyacrylamides exist, which may vary from one another by at least their molecular weights, the choice of which can typically be based upon the application.

Further, cationic polyacrylamides may also vary from one another by at least their cationic charges. For example, a cationic polyacrylamide may have (i) a low cationic charge, corresponding to about 0.75 mole percent to about 15 mole percent of the polyacrylamide carrying a positive charge; (ii) a medium cationic charge, corresponding to about 20 mole percent to about 35 mole percent of the polyacrylamide carrying a positive charge; and (iii) a high cationic charge, corresponding to about 40 mole percent to about 100 mole percent of the polyacrylamide carrying a positive charge.

Powdered Coagulant-Flocculant Mixture

As to particular embodiments, the novel coagulant-flocculant mixture (4) useful with the instant method can be in a solid form, such as a powder, whereby the term "powder" as used herein means substantially dry matter in a divided state, such as a finely divided state.

Following, for incorporation into a powdered coagulant-flocculant mixture (4), the coagulant (6) can be provided in solid form, for example as a powder. As but one non-limiting example, FLOQUAT™ TS 45 SH, which is a polyDADMAC powder, may be useful for incorporation into a powdered coagulant-flocculant mixture (4) and can be obtained as a commercial product from SNF.

Additionally, for incorporation into a powdered coagulant-flocculant mixture (4), the flocculant (7) can be provided in solid form, for example as a powder. As but one non-limiting example, SEDIFLOC 408CHH GG, which is a cationic acrylamide polymer powder, may be useful for incorporation into a powdered coagulant-flocculant mixture (4) and can be obtained as a commercial product from 3F Chimica Americas, Inc.

Regarding amounts, the coagulant (6) and the flocculant (7) can be incorporated into the powdered coagulant-flocculant mixture (4) in any of a numerous and wide variety of amounts depending upon the application and particularly, depending upon the effluent and the specific coagulant and flocculant selected for use.

As to particular embodiments, the coagulant (6) and the flocculant (7) can be incorporated into the powdered coagulant-flocculant mixture (4) in substantially equal amounts by weight, thus as a 1:1 weight ratio.

As to other particular embodiments, to provide the powdered coagulant-flocculant mixture (4), a greater amount by weight of the coagulant (6) can be combined with a lesser amount by weight of the flocculant (7). As but one non-limiting example, the coagulant (6) and the flocculant (7) can be incorporated into the powdered coagulant-flocculant mixture (4) in a weight ratio of 2:1 (coagulant:flocculant).

As to yet other particular embodiments, to provide the powdered coagulant-flocculant mixture (4), a lesser amount by weight of the coagulant (6) can be combined with a greater amount by weight of the flocculant (7). As but one non-limiting example, the coagulant (6) and the flocculant (7) can be incorporated into the powdered coagulant-flocculant mixture (4) in a weight ratio of 1:4 (coagulant:flocculant).

Fluid Coagulant-Flocculant Mixture

As to particular embodiments, the novel coagulant-flocculant mixture (4) useful with the instant method can be in a fluid form, such as a liquid form, whereby the term "fluid" as used herein means flowing or flowable; not solid.

Following, the coagulant-flocculant mixture (4) can further include a fluid vehicle, such as a liquid vehicle, which can function as a carrier for the coagulant (6) and the flocculant (7), thus providing a fluid coagulant-flocculant mixture (4). As but one non-limiting example, the liquid vehicle can be an aqueous liquid, such as water.

Regarding the coagulant (6), as to particular embodiments, the coagulant (6) can be provided in solid form, as described above, for combination with the flocculant (7) and the fluid vehicle.

As to other particular embodiments, the coagulant (6) can be provided in liquid form, for example as a coagulant solution or a coagulant emulsion, for combination with the flocculant (7) and the fluid vehicle. As but one non-limiting example, QEMIFLOC FL 54C, which is a polyDADMAC solution, may be useful for incorporation into a fluid coagulant-flocculant mixture (4) and can be obtained as a commercial product from SNF.

Now regarding the flocculant (7), as to particular embodiments, the flocculant (7) can be provided in solid form, as described above, for combination with the coagulant (6) and the fluid vehicle.

As to other particular embodiments, the flocculant (7) can be provided in liquid form, for example as a flocculant solution or a flocculant emulsion, for combination with the coagulant (6) and the fluid vehicle. As but one non-limiting example, SUPERFLOC C-1601, which is a cationic polyacrylamide emulsion, may be useful for incorporation into a fluid coagulant-flocculant mixture (4) and can be obtained as a commercial product from Kemira.

To prepare a fluid coagulant-flocculant mixture (4), the coagulant (6), the flocculant (7), and the fluid vehicle can be combined in a variety of ways.

As one non-limiting example, the coagulant (6), whether in solid or liquid form, can first be combined with the flocculant (7), whether in solid or liquid form, to provide a coagulant-flocculant mixture (4). Subsequently, the coagulant-flocculant mixture (4) can be combined with the fluid vehicle to provide the fluid coagulant-flocculant mixture (4).

As a second non-limiting example, the coagulant (6), whether in solid or liquid form, can first be combined with the fluid vehicle to provide a coagulant-vehicle mixture. Subsequently, the coagulant-vehicle mixture can be combined with the flocculant (7), whether in solid or liquid form, to provide the fluid coagulant-flocculant mixture (4).

As a third non-limiting example, the flocculant (7), whether in solid or liquid form, can first be combined with the fluid vehicle to provide a flocculant-vehicle mixture. Subsequently, the flocculant-vehicle mixture can be combined with the coagulant (6), whether in solid or liquid form, to provide the fluid coagulant-flocculant mixture (4).

Regarding amounts, the coagulant (6) and the flocculant (7) can be incorporated into the fluid coagulant-flocculant mixture (4) in any of a numerous and wide variety of amounts, depending upon the application and specifically, depending upon the effluent and the specific coagulant and flocculant selected for use.

Regarding the coagulant (6), the amount of coagulant (6) can be not greater than about 25% by weight of the fluid coagulant-flocculant mixture (4). It is to be understood that, as used herein, "an amount of coagulant" is always greater than 0.

As to particular embodiments, the amount of coagulant (6) can be selected from the group including or consisting of: not greater than about 25% by weight of the fluid coagulant-flocculant mixture (4); not greater than about 22.5% by weight of the fluid coagulant-flocculant mixture (4); not greater than about 20% by weight of the fluid coagulant-flocculant mixture (4); not greater than about 17.5% by weight of the fluid coagulant-flocculant mixture (4); not greater than about 15% by weight of the fluid coagulant-flocculant mixture (4); not greater than about 12.5% by weight of the fluid coagulant-flocculant mixture (4); not greater than about 10% by weight of the fluid coagulant-flocculant mixture (4); not greater than about 7.5% by weight of the fluid coagulant-flocculant mixture (4); not greater than about 5% by weight of the fluid coagulant-flocculant mixture (4); not greater than about 4% by weight of the fluid coagulant-flocculant mixture (4); not greater than about 3% by weight of the fluid coagulant-flocculant mixture (4); not greater than about 2% by weight of the fluid coagulant-flocculant mixture (4); and not greater than about 1% by weight of the fluid coagulant-flocculant mixture (4).

As but one illustrative example, a particular embodiment of a fluid coagulant-flocculant mixture (4) useful with the instant method can include about 2% coagulant (6) by weight of the fluid coagulant-flocculant mixture (4).

For the purpose of illustration only, if 1 pound of a fluid coagulant-flocculant mixture (4) comprising 2% coagulant (6) by weight of the fluid coagulant-flocculant mixture (4) is desired, upon provision of the coagulant (6) in solid form, 0.02 pounds of the coagulant (6), for example polyDADMAC powder, would be required.

Alternatively and again for the purpose of illustration only, if 1 pound of a fluid coagulant-flocculant mixture (4) comprising 2% coagulant (6) by weight of the fluid coagulant-flocculant mixture (4) is desired, upon provision of the coagulant (6) in liquid form, 0.04 pounds of a coagulant-containing liquid comprising 50% coagulant (6) by weight of the coagulant-containing liquid, for example a polyDADMAC solution comprising 50% polyDADMAC by weight of the polyDADMAC solution, would be required. Of note, when the coagulant (6) is provided in liquid form, the percent of coagulant (6) within the coagulant-containing liquid should be taken into consideration when calculating the amount of coagulant-containing liquid needed for incorporation into the fluid coagulant-flocculant mixture (4).

Now regarding the flocculant (7), the amount of flocculant (7) can be not greater than about 25% by weight of the fluid coagulant-flocculant mixture (4). It is to be understood that, as used herein, "an amount of flocculant" is always greater than 0.

As to particular embodiments, the amount of flocculant (7) can be selected from the group including or consisting of: not greater than about 25% by weight of the fluid coagulant-flocculant mixture (4); not greater than about 22.5% by weight of the fluid coagulant-flocculant mixture (4); not greater than about 20% by weight of the fluid coagulant-flocculant mixture (4); not greater than about 17.5% by weight of the fluid coagulant-flocculant mixture (4); not greater than about 15% by weight of the fluid coagulant-flocculant mixture (4); not greater than about 12.5% by weight of the fluid coagulant-flocculant mixture (4); not greater than about 10% by weight of the fluid coagulant-flocculant mixture (4); not greater than about 7.5% by weight of the fluid coagulant-flocculant mixture (4); not greater than about 5% by weight of the fluid coagulant-flocculant mixture (4); not greater than about 4% by weight of the fluid coagulant-flocculant mixture (4); not greater than about 3% by weight of the fluid coagulant-flocculant mixture (4); not greater than about 2% by weight of the fluid coagulant-flocculant mixture (4); and not greater than about 1% by weight of the fluid coagulant-flocculant mixture (4).

As but one illustrative example, a particular embodiment of a fluid coagulant-flocculant mixture (4) useful with the instant method can include about 4% flocculant (7) by weight of the fluid coagulant-flocculant mixture (4).

For the purpose of illustration only, if 1 pound of a fluid coagulant-flocculant mixture (4) comprising 4% flocculant (7) by weight of the fluid coagulant-flocculant mixture (4) is desired, upon provision of the flocculant (7) in solid form, 0.04 pounds of the flocculant (7), for example cationic acrylamide polymer powder, would be required.

Alternatively and again for the purpose of illustration only, if 1 pound of a fluid coagulant-flocculant mixture (4) comprising 4% flocculant (7) by weight of the fluid coagulant-flocculant mixture (4) is desired, upon provision of the flocculant (7) in liquid form, 0.08 pounds of a flocculant-containing liquid comprising 50% flocculant (7) by weight of the flocculant-containing liquid, for example a cationic polyacrylamide emulsion comprising 50% polyacrylamide by weight of the cationic polyacrylamide emulsion, would be required. Of note, when the flocculant (7) is provided in liquid form, the percent of flocculant (7) within the flocculant-containing liquid should be taken into consideration when calculating the amount of flocculant-containing liquid needed for incorporation into the fluid coagulant-flocculant mixture (4).

Coagulant-Flocculant Mixture Addition to Effluent

For combination with the effluent (1), the coagulant-flocculant mixture (4), whether in a solid or fluid form, can be used in any of a numerous and wide variety of amounts, depending upon the application and particularly, depending upon the effluent and the specific coagulant and flocculant selected for use.

For example, the amount of coagulant-flocculant mixture (4) combined with the effluent (1) can be in a range of between about 1 ppm to about 100 ppm, whereby both the amount of coagulant (6) and the amount of flocculant (7) are summed to calculate the ppm.

As to particular embodiments, the amount of coagulant-flocculant mixture (4) combined with the effluent (1) can be selected from the group including or consisting of: not greater than about 200 ppm; not greater than about 190 ppm; not greater than about 180 ppm; not greater than about 170 ppm; not greater than about 160 ppm; not greater than about 150 ppm; not greater than about 140 ppm; not greater than about 130 ppm; not greater than about 120 ppm; not greater than about 110 ppm; not greater than about 100 ppm; not greater than about 90 ppm; not greater than about 80 ppm; not greater than about 70 ppm; not greater than about 60 ppm; not greater than about 50 ppm; not greater than about 40 ppm; not greater than about 30 ppm; not greater than about 20 ppm; not greater than about 15 ppm; not greater than about 10 ppm; and not greater than about 5 ppm.

As but one non-limiting example, a fluid coagulant-flocculant mixture (4) (which for the sake of simplicity, is considered to have a specific gravity of 1) can be combined with effluent (1) (which for the sake of simplicity, is considered to have a specific gravity of 1) to effectively separate the particles (2) and the aqueous medium (3) within the effluent (1) as follows: to about 1,250 gallons/minute of effluent (1) (which corresponds to about 10,432 pounds/minute), add about 1 gallon/minute of fluid coagulant-flocculant mixture (4) (which corresponds to about 8.35 pounds/minute) containing 2% coagulant (6) by weight of the fluid coagulant-flocculant mixture (4) (which corresponds to about 0.167 pounds/minute) and 4% flocculant (7) by weight of the fluid coagulant-flocculant mixture (4) (which corresponds to about 0.334 pounds/minute). Accordingly, the amount of coagulant (6) provided by the fluid coagulant-flocculant mixture (4) for combination with the effluent (1) is about 16 ppm, and the amount of flocculant (7) provided by the fluid coagulant-flocculant mixture (4) for combination with the effluent (1) is about 32 ppm. Following, the total amount of coagulant (6) and flocculant (7), both provided by the fluid coagulant-flocculant mixture (4), combined with the effluent (1) is about 48 ppm.

Further Separation

After the instant method's single step of combining an amount of a coagulant-flocculant mixture (4) with an amount of effluent (1) to provide a contacted effluent (5) is provided, the particles (2) can be further separated from the aqueous medium (3) by conventional separation techniques, as would be known to one of ordinary skill in the art of effluent treatment.

For example, the particles (2) can be further separated from the aqueous medium (3) by decantation, centrifugation, flotation (such as dissolved air flotation or DAF), or filtration, as but a few non-limiting examples.

Example #1

A jar test, which is a small-scale test, was performed to assess the effect of treating effluent (1) with the instant coagulant-flocculant mixture (4) in comparison with a conventional effluent treatment.

Correspondingly, a particular embodiment of the instant coagulant-flocculant mixture (4) was prepared in fluid form by combining coagulant (6) in liquid form and flocculant (7) in solid form to provide a coagulant-flocculant mixture (4) including 0.125% coagulant (6) (specifically QEMIFLOC FL 54C, which is a polyDADMAC solution having a specific gravity of about 1) by weight of the coagulant-flocculant mixture (4) and 0.25% flocculant (7) (specifically SEDIFLOC 408CHH GG, which is a cationic acrylamide polymer powder) by weight of the coagulant-flocculant mixture (4).

Following, for 100 mL of the coagulant-flocculant mixture (4) including 0.125% coagulant (6) by weight of the coagulant-flocculant mixture (4) and 0.25% flocculant (7) by weight of the coagulant-flocculant mixture (4), 0.3 mL of coagulant (6) (specifically QEMIFLOC FL 54C, which comprises about 42% polyDADMAC by weight of the polyDADMAC solution), can be combined with 0.25 g of flocculant (specifically SEDIFLOC 408CHH GG) and water for a total volume of 100 mL.

Subsequently, in a single step, the coagulant-flocculant mixture (4) was added to effluent (1) having the form of wastewater from a beef slaughterhouse to provide contacted effluent (5). Particularly, 15 mL of the coagulant-flocculant mixture (4) was added to 500 mL of effluent (1); accordingly, the contacted effluent (5) contained 36 ppm coagulant, 73 ppm flocculant coagulant, and 109 ppm active agents (coagulant (6) and flocculant (7)).

Also, for comparison, the same effluent (1) was treated using a conventional effluent treatment, whereby 15 mL of a 0.25% flocculant (specifically SEDIFLOC 408CHH GG) and water blend was added to 500 mL of effluent (1).

Figure 3:
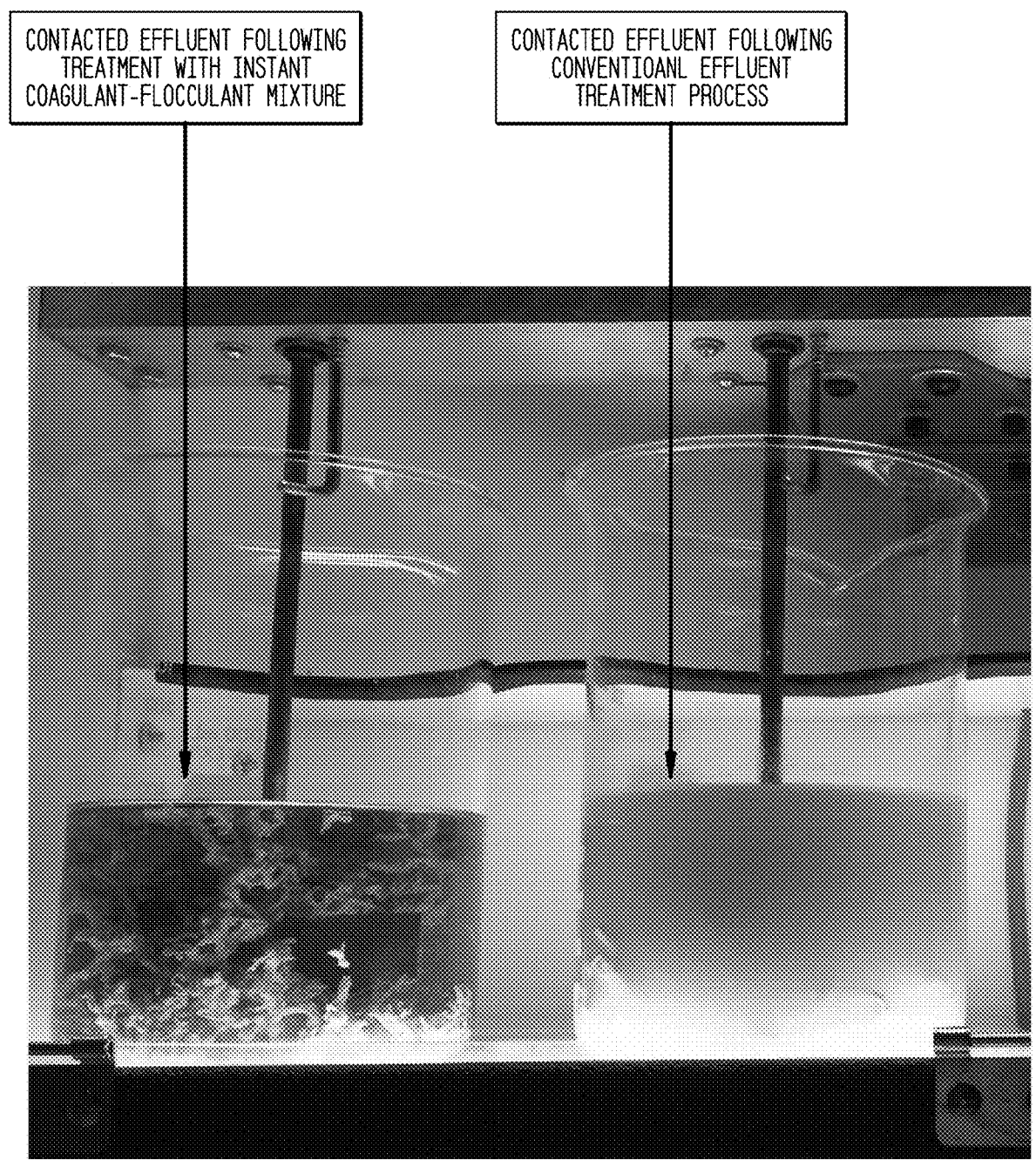
FIG. 3 is a photograph showing the results obtained upon treating effluent with an embodiment the instant coagulant-flocculant mixture (left) in comparison with the results obtained upon treating effluent with a conventional effluent treatment.

Now referring primarily to FIG. 3, the contacted effluent (5) resulting from treatment with the instant coagulant-flocculant mixture (4) is shown on the left, which should be compared to the contacted effluent (5) resulting from the conventional effluent treatment shown on the right.

Importantly, the contacted effluent (5) resulting from treatment with the instant coagulant-flocculant mixture (4) showed significantly less turbidity, which is an optical property of water, in relation to the contacted effluent (5) resulting from the conventional effluent treatment.

Said another way, the contacted effluent (5) resulting from treatment with the instant coagulant-flocculant mixture (4) showed significantly greater clarity in relation to the contacted effluent (5) resulting from the conventional effluent treatment.

Notably, the instant results are a marked improvement, both in terms of decreasing effluent turbidity and increasing effluent clarity, in relation to a conventional effluent treatment, and should be classified as a difference in kind, rather than one of degree.

Example #2

Figure 4B:
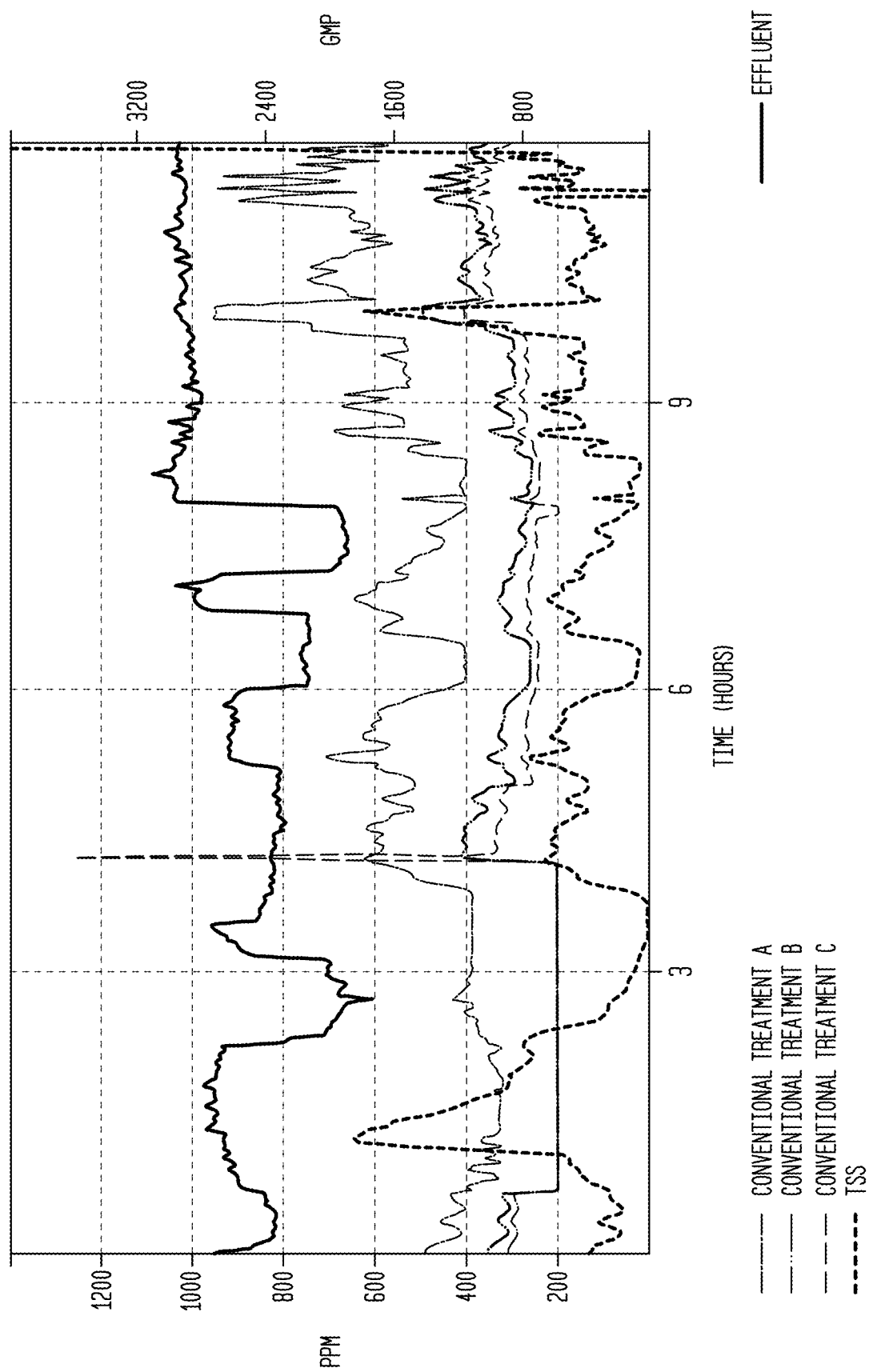
FIG. 4B is graph showing a decrease in total suspended solids (TSS) in effluent as a result of the addition of a combination of three conventional effluent treatments.

Large-scale tests were performed to assess the effect of treating effluent (1) with the instant coagulant-flocculant mixture (4) in comparison with a combination of three conventional effluent treatments, whereby the results of these tests are shown in FIG. 4A and FIG. 4B.

Correspondingly, a particular embodiment of the instant coagulant-flocculant mixture (4) was prepared in fluid form by combining coagulant (6) in liquid form and flocculant (7) in solid form to provide a coagulant-flocculant mixture (4) including 0.125% coagulant (6) (specifically QEMIFLOC FL 54C, which is a polyDADMAC solution having a specific gravity of about 1) by weight of the coagulant-flocculant mixture (4) and 0.25% flocculant (7) (specifically SEDIFLOC 408CHH GG, which is a cationic acrylamide polymer powder) by weight of the coagulant-flocculant mixture (4).

Subsequently, an effluent treatment, whether (i) the instant coagulant-flocculant mixture (4) or (ii) the combination of three conventional effluent treatments, was added to effluent (1) having the form of wastewater from a beef slaughterhouse. Specifically, the effluent treatment was continually added to a flow of effluent (1) over 12 hours, whereby the effluent treatment was added to the effluent (1) to decrease the total suspended solids (TSS) in the effluent (1) and consequently, to decrease effluent turbidity and increase effluent clarity.

In the resultant graphs shown in FIG. 4A and FIG. 4B, the x axis denotes time (in hours), the right y axis denotes the amount of effluent (1) in gallons per minute (GPM), and the left y axis denotes the amount of effluent treatment added to the effluent (1), whereby (i) the amount of the instant coagulant-flocculant mixture (4) is shown in parts per million (PPM)/10 in FIG. 4A, and (ii) the amount of conventional effluent treatments A, B, and C is shown in PPM in FIG. 4B. Additionally, the left y axis denotes the amount of TSS in PPM in the effluent (1).

FIG. 4A shows that the instant coagulant-flocculant mixture (4) is effective to decrease the amount of TSS in the effluent (1) to about 200 PPM. In comparison, FIG. 4B shows that a combination of three conventional effluent treatments is necessary to decrease the amount of TSS in the effluent (1) to about the same amount (about 200 PPM) as the instant coagulant-flocculant mixture (4). Thus, it appears that the instant coagulant-flocculant mixture (4) is at least as effective if not more effective than the combination of three conventional effluent treatments for decreasing the amount of TSS in effluent (1) and consequently, for decreasing effluent turbidity and increasing effluent clarity.

Notably, the instant results are a marked improvement in terms of decreasing the amount of TSS in effluent (1) in relation to conventional effluent treatments, and should be classified as a difference in kind, rather than one of degree.

Additionally, it has been noted that the instant coagulant-flocculant mixture (4) in fluid form is significantly more stable than conventional effluent treatments. For example, whereas conventional effluent treatments may have a shelf life of not greater than about three months, the instant coagulant-flocculant mixture (4) has a shelf life of at least four months, which is a marked improvement in stability.

As can be easily understood from the foregoing, the basic concepts of the present invention may be embodied in a variety of ways. The invention involves numerous and varied embodiments of an effluent treatment mixture and methods for making and using such an effluent treatment mixture.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "mixture" should be understood to encompass disclosure of the act of "mixing"—whether explicitly discussed or not—and, conversely, were there effectively disclosure of the act of "mixing", such a disclosure should be understood to encompass disclosure of a "mixture" and even a "means for mixing". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the effluent treatment mixtures herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of treating effluent containing particles within an aqueous medium, comprising:
    providing a coagulant-flocculant mixture consisting of:
        a cationic coagulant consisting of polyDADMAC, poly(epi-DMA), or combinations thereof; and
        a cationic or nonionic flocculant;
    subsequently combining an amount of said coagulant-flocculant mixture with an amount of said effluent; and
    separating said particles and said aqueous medium.

2. The method of claim 1, wherein said cationic flocculant consists of a cationic polyacrylamide.

3. The method of claim 1, wherein said coagulant-flocculant mixture comprises a powder form.

4. The method of claim 1, further comprising subjecting said effluent combined with said coagulant-flocculant mixture to decantation to separate said particles and said aqueous medium.

5. The method of claim 1, further comprising subjecting said effluent combined with said coagulant-flocculant mixture to centrifugation to separate said particles and said aqueous medium.

6. The method of claim 1, further comprising subjecting said effluent combined with said coagulant-flocculant mixture to flotation to separate said particles and said aqueous medium.

7. The method of claim 1, further comprising subjecting said effluent combined with said coagulant-flocculant mixture to dissolved air flotation to separate said particles and said aqueous medium.

8. The method of claim 1, further comprising subjecting said effluent combined with said coagulant-flocculant mixture to filtration to separate said particles and said aqueous medium.

9. A method of treating effluent comprising wastewater containing solids, fats, greases, and/or oils within an aqueous medium, said wastewater generated by agricultural, industrial, sewage, or mining operations, comprising:
    providing a coagulant-flocculant mixture consisting of:
        a coagulant consisting of polyDADMAC, poly(epi-DMA), or combinations thereof;
        a flocculant; and
        a liquid vehicle;
    subsequently combining an amount of said coagulant-flocculant mixture with an amount of said effluent; and
    subjecting said effluent combined with said coagulant-flocculant mixture to centrifugation and/or flotation to separate said solids, fats, greases, and/or oils and said aqueous medium.

10. The method of claim 9, wherein said flocculant consists of a nonionic flocculant.

11. The method of claim 9, wherein said flocculant consists of a cationic flocculant.

12. The method of claim 11, wherein said cationic flocculant consists of a cationic polyacrylamide.

13. The method of claim 9, wherein said liquid vehicle comprises an aqueous liquid.

14. The method of claim 13, wherein said aqueous liquid comprises water.

15. The method of claim 9, further comprising subjecting said effluent combined with said coagulant-flocculant mixture to dissolved air flotation to separate said solids, fats, greases, and/or oils and said aqueous medium.

* * * * *